United States Patent [19]
Berlin, Jr.

[11] 4,428,048
[45] Jan. 24, 1984

[54] MULTIPROCESSOR WITH STAGGERED PROCESSING

[75] Inventor: Edwin P. Berlin, Jr., Greenlawn, N.Y.

[73] Assignee: Grumman Aerospace Corporation, Bethpage, N.Y.

[21] Appl. No.: 229,269

[22] Filed: Jan. 28, 1981

[51] Int. Cl.³ ............................................. G06F 15/16
[52] U.S. Cl. .................................................... 364/200
[58] Field of Search ................................. 364/200, 900

[56] References Cited

U.S. PATENT DOCUMENTS

| | | | |
|---|---|---|---|
| 3,401,380 | 9/1968 | Bell et al. | 340/172.5 |
| 3,603,934 | 9/1971 | Heath et al. | 340/172.5 |
| 3,803,560 | 4/1974 | DeVoy et al. | 340/172.5 |
| 3,810,114 | 5/1974 | Yamada et al. | 364/200 |
| 3,812,468 | 5/1974 | Wollum et al. | 340/172.5 |
| 3,997,879 | 12/1976 | Markley et al. | 340/172.5 |
| 4,007,450 | 2/1977 | Haibt et al. | 364/200 |
| 4,017,828 | 4/1977 | Watanabe et al. | 340/146.1 BE |
| 4,050,001 | 9/1977 | Kishi et al. | 318/625 |
| 4,075,693 | 2/1978 | Fox et al. | 364/200 |
| 4,085,448 | 4/1979 | Kogge | 364/900 |
| 4,112,489 | 9/1978 | Wood | 364/200 |
| 4,129,901 | 12/1978 | Masuda | 364/104 |
| 4,133,042 | 1/1979 | Wallace | 364/900 |
| 4,151,590 | 4/1979 | Azegami | 364/115 |
| 4,363,094 | 12/1982 | Kaul et al. | 364/200 |

Primary Examiner—James D. Thomas
Assistant Examiner—David Y. Eng
Attorney, Agent, or Firm—Morgan, Finnegan, Pine, Foley & Lee

[57] ABSTRACT

A data processing system includes a set of modules for processing data applied to the modules from a common data bus. The data is presented serially, with individual words of the data being separated by strobe signals. The time interval allocated for processing by a module extends over a plurality of data words. The processing operations of the respective modules are initiated in staggered time, the operations overlapping each other in time. A daisy chain comprising individual units in each module propagates a strobe signal along the chain for initiating the respective operations. Each daisy unit includes a circuit for performing the exclusive-OR function between a present and a previous daisy signal propagated between successive units of a chain. Increased throughput and fault tolerance are thereby provided upon a variation in the number of modules, such a variation in the number of modules being accomplished without the necessity of re-writing the system software.

12 Claims, 5 Drawing Figures

| DATA STROBE | DAISY INPUT TO MODULE | | | | DAISY INPUT ⊕ WITH PREVIOUS DAISY INPUT AT MODULE | | | |
|---|---|---|---|---|---|---|---|---|
| | #1 | #2 | #3 | #4 | #1 | #2 | #3 | #4 |
| 1 | 1 | 0 | 0 | 0 | 1 | 0 | 0 | 0 |
| 2 | 1 | 1 | 0 | 0 | 0 | 1 | 0 | 0 |
| 3 | 1 | 1 | 1 | 0 | 0 | 0 | 1 | 0 |
| 4 | 1 | 1 | 1 | 1 | 0 | 0 | 0 | 1 |
| 5 | 0 | 1 | 1 | 1 | 1 | 0 | 0 | 0 |
| 6 | 0 | 0 | 1 | 1 | 0 | 1 | 0 | 0 |
| 7 | 0 | 0 | 0 | 1 | 0 | 0 | 1 | 0 |
| 8 | 0 | 0 | 0 | 0 | 0 | 0 | 0 | 1 |
| 9 | 1 | 0 | 0 | 0 | 1 | 0 | 0 | 0 |

4,428,048

MULTIPROCESSOR WITH STAGGERED PROCESSING

BACKGROUND OF THE INVENTION

This invention relates to data processors and, more particularly, to a processing system incorporating a set of modules which are activated by a common data bus, but perform processing operations on sequential blocks of the data in staggered time sequence.

Data processors, such as computers, are often used in situations wherein additional processing power is desirable. Indeed, systems employing data processors can be more readily adapted to perform a task when higher throughput rates are available. Furthermore, when such systems are used in avionics, the systems have the added requirements of modularity, expandibility, adaptability for incorporating new technologies, and fault tolerance.

Processing systems may incorporate many microprocessors to perform arithmetic operations, data sorting, and other processes with the incoming data. Fortunately, microprocessors are becoming one of the least expensive components of a computer system. Typically, more engineering effort is expended on software design, debugging, and modification than is expended on the corresponding hardware tasks. Therefore, it is most desirable to have a computer system which can be upgraded to incorporate future developments in technology without necessitating a complete rewrite of the software.

However, a problem exists in that with present data processing equipment, the computer hardware and software are so interrelated that a change in hardware configuration usually results in a need for extensive software revision. The computer architecture does not permit the replacement of one type of processing component with another type of processing component without a corresponding rewrite of the software. Thus, a processing component of a data processor cannot readily be updated to incorporate recent technological developments.

A further problem encountered in data processing equipment is the difficulty in increasing the data throughput rate. One method of improving the throughput rate of a process is to increase the computational efficiency of an algorithm as is done in the computation of a fast Fourier transform of a set of numbers. Algorithms are also used for the efficient machines solution of a large class of general problems such as sorting, numerical approximations, and matrix operations. In the design of data processing equipment and in the development of the algorithms to be used therewith, a tradeoff is often made between program or data memory requirements and execution time. Such a tradeoff is exemplified in the choice of calculating trigonometric functions using the Taylor expansion, or by using a lookup table. Also, the instruction set of a computer can have such impact on program efficiency as may be seen, by way of example, in the microcoding of the instructions for the evaluation of a polynomial.

Another atempt at the increasing of the throughput rate is the use of a set of processors operating in a pipeline format. Therein, a series of functional modules are interconnected by registers to allow partially completed terms of a mathematical process to propagate down the pipeline for completion in the latter modules. Thereby, the modules can operate simultaneously. Such an interconnection of the hardware is useful when the same operation is performed repeatedly on different data. For example, a multiplier may be pipelined by reducing it to a series of adders and inserting registers between the adders. For a pipelined system, the fundamental operation must be determined before the hardware is designed. Pipelining is limited in its adaptability in that recursive functions cannot be speeded up by simply inserting registers, since a new calculation cannot begin until previous calculations by a previous module has been completed.

Another arrangement of data processing elements which is used to increase the throughput rate is the array processor. An array processor is a computer with a multiplicity of arithmetic logic units and a single program control structure. Array processors are usually difficult to program efficiently, since the function to be implemented by the processor must be made to fit the array size. Programs written in a higher level language for a sequential machine cannot be compiled in an array processor to make full use of the parallel architecture.

Even with multiprocessors, difficulties are still experienced in maximizing a throughput rate. A multiprocessor is a system containing more than one processor, each with its own arithmetic logic unit and control structure. Processors may share memory for interprocess communication or economy. Multiprocessors often are subject to the same consideration that pertain to pipeline architecture. Unless the required function to be performed inherently has a high degree of separate, noninteracting operations, the function must be separated into sequential calculations which are then performed in the various processors of the system. In general, all processors run different programs and the entire system is required to debug the software. The timing of interprocess interaction makes this software unduly complicated.

SUMMARY OF THE INVENTION

The foregoing problems are overcome and other advantages are provided by a data processing system incorporating multiple processors and wherein the system architecture allows the addition of processors for increased throughput without the need for a rewrite of system software. The system provides an increase of the throughput rate by a staggered overlapping of the processing times of the respective processors. Each processor includes its own data and programs memories.

In accordance with the invention, the system is constructed of a set of modules each of which comprises a data processor and a daisy unit. Data is routed to all of the processors simultaneously. Each processor performs its predetermined function, such as a mathematical operation, independently of the operations of the other processors. The processors handle function partitioning and processor timing by use of a daisy chain formed by the serial connection of the daisy units of the respective modules to pass interprocessor control signals. Thus, control functions are completely distributed.

Due to the independent operation of each of the processors, newer processors incorporating more recent technological innovations can readily be substituted for an existing processor without requiring a redesign of the system hardware. With respect to the system throughput, the delay through the system is equal to the delay of a single processor, and the system throughput is the throughput of one processor multiplied by the number of processors in the system. The function provided by any one of the processors does not have to be subdivided or partitioned, and all the timing and data routing with respect to the processor function are handled by the individual processor.

A data strobe precedes each data word, or set of words, which is to be utilized by a single processor. The processor may include a computer or other form of data manipulating circuitry. For convenience in describing the invention, a computer will be assumed. The computer, generally in the form of a microprocessor, includes a central processing unit (CPU) as well as data and program memories. In each module, the daisy unit provides a strobe (the daisy strobe, hereinafter) to the interrupt terminal of the CPU. Thereby, in each module the daisy unit initiates the operation of the processor.

The foregoing serial connection of the daisy units is formed into a ring circuit by an inverter connecting the last daisy unit to the first daisy unit. Upon being triggered by the data strobe, each daisy unit produces its daisy strobe by performing the exclusive-OR function between the present and previous daisy input signals. The system is initialized upon the application of power to the system, at which time all the modules output zero on their respective daisy output lines. Due to the inverter, the daisy input signal to the first module is a logic one, while the remaining daisy input signals are all zero. Upon the simultaneous application of the data strobe to each of the modules, all of the daisy units simultaneously propagate their respective daisy input signals to their respective output terminals. As a result, the operation of the exclusive-OR circuit in each daisy unit produces a logic one initially at the daisy unit of the first module, with further occurrences of the daisy strobe appearing successively at the subsequent modules. Thus, the daisy strobe circulates around the daisy circuit to initiate the operation of each processor successively in accordance with the occurrences of the data strobes. The time available for the processing at each module is the time between the successive occurrences of the data words multiplied by the number of processors in the system. Thereby, the successive operations of the respective modules occur in a time-staggered format. In the event of failure of any one of the modules, that module is disconnected from the system and the daisy strobe propagates around a daisy circuit which has been shortened by the deletion of one daisy unit. The remaining modules continue to function as though no fault had occurred and, accordingly, provide the system with a fault tolerant capability. This disconnection may be performed automatically using some standard methods for detecting a failure in conjunction with tri-state buffers to reroute the daisy signal around the faulty module.

BRIEF DESCRIPTION OF THE DRAWINGS

The aforementioned features and other aspects of the invention are described in the following description taken in connection with the accompanying drawings wherein.

DESCRIPTION OF THE PREFERRED EMBODIMENT

Figure 1:
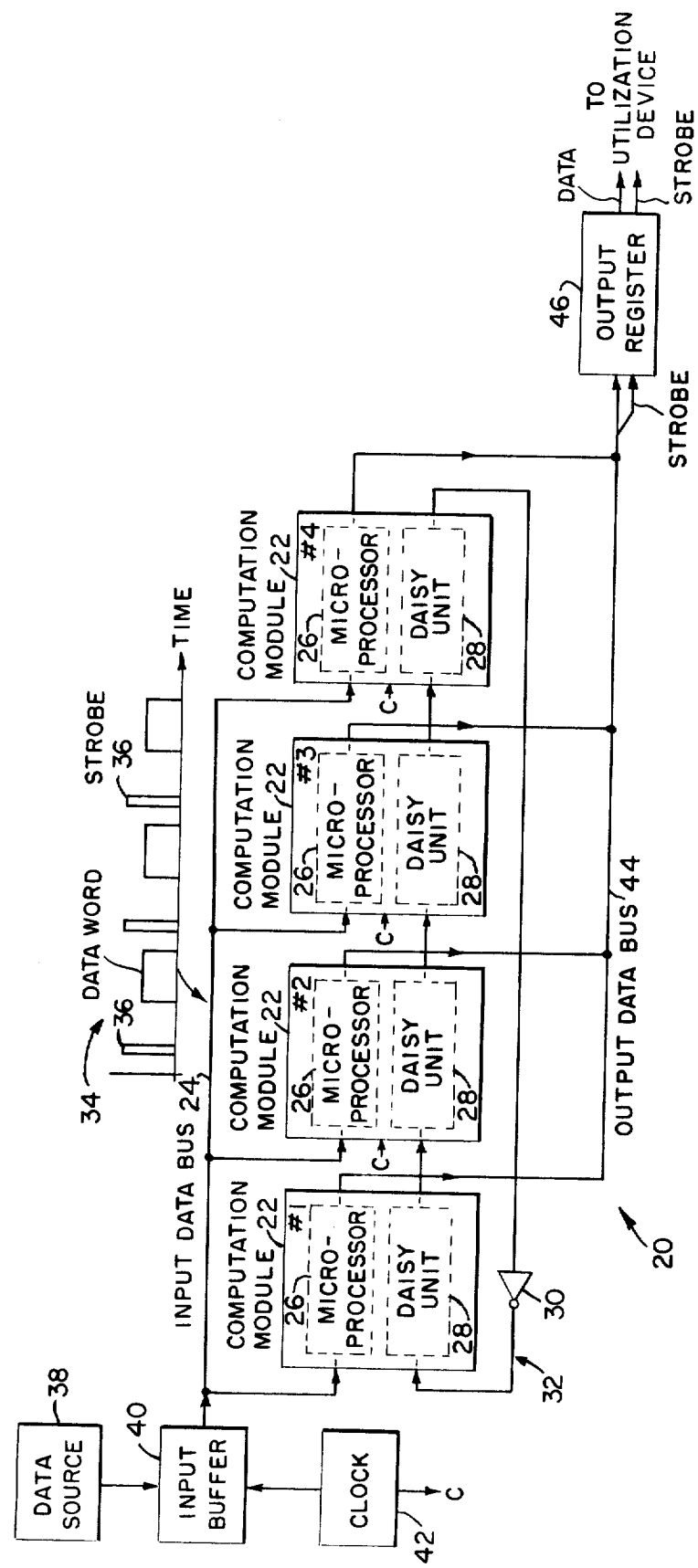
FIG. 1 is a block diagram of a multiple processor system incorporating the invention, the figure showing daisy units of individual modules connected in a ring circuit.

Referring now to FIG. 1, a data processing system 20 comprises a set of modules 22 for performing digital computations with data supplied via a input data bus 24. In accordance with the invention, each module 22 comprises a microprocessor 26 and a daisy unit 28, the daisy units 28 being serially connected with an inverter 30 in a ring circuit 32 for timing the computations in a staggered overlapping time sequence. The input data is provided in digital format and is portrayed in a graph 34 appended to the input data bus 24. The graph 34 shows data strobes 36 each of which precedes an interval of time during which a data word or a set of data words appears on the bus 24. The data on the bus 24 is provided from a data source 38 via an input buffer unit 40, the buffer unit 40 being strobed by clock signals from a clock 42. Computed quantities provided by each of the modules 22 appear on an output data bus 44, the data on the bus 44 being clocked into an output register 46. The data on the bus 44 and in the register 46 includes a strobe to facilitate presentation to a utilization device.

By way of example in the use of the system 20, the system 20 may serve as a filter in a guidance system for controlling vehicular motion. Thus, the source 38 would include data from sensors of speed and attitude while the utilization device would comprise steering and propulsion control elements. Each of the modules 22 is coupled between the input bus 24 and the output bus 44. Thus, each of the modules 22 participates in the calculation of terms to appear in the filter function. For example, assuming that each of the data words in the graph 34 represents a set of data points, then the microprocessor 26 in each module 22 would perform a finite impulse response, or other type of filter operation on the data points. While any number of modules 22 may be utilized in the system 20, four such modules are depicted by way of example in FIG. 1. Thus, the first of the modules 22 would, in response to the first data strobe signal 36, accept the first data word and begin processing that data word. Prior to the completion of the processing, the second, third and fourth of the modules 22 would begin processing successive ones of the data words depicted in the graph 34. Thus, the computation intervals of the respective modules 22 are seen to overlap each other, and to begin in staggered fashion. Also, the computed results of each of the modules appear in serial fashion at the output data bus 44. The total delay time elapsed between an input data word and a corresponding output data word is equal to the processing time of one of the modules 22. Accordingly, the various outputs of the filter function are produced in a cyclical fashion with the first four outputs, or data words, being produced respectively by successive ones of the four modules 22, the fifth output of the sequence being produced by the first module, the sixth output being produced by the second module with the process continuing in cyclical fashion.

Figure 2:
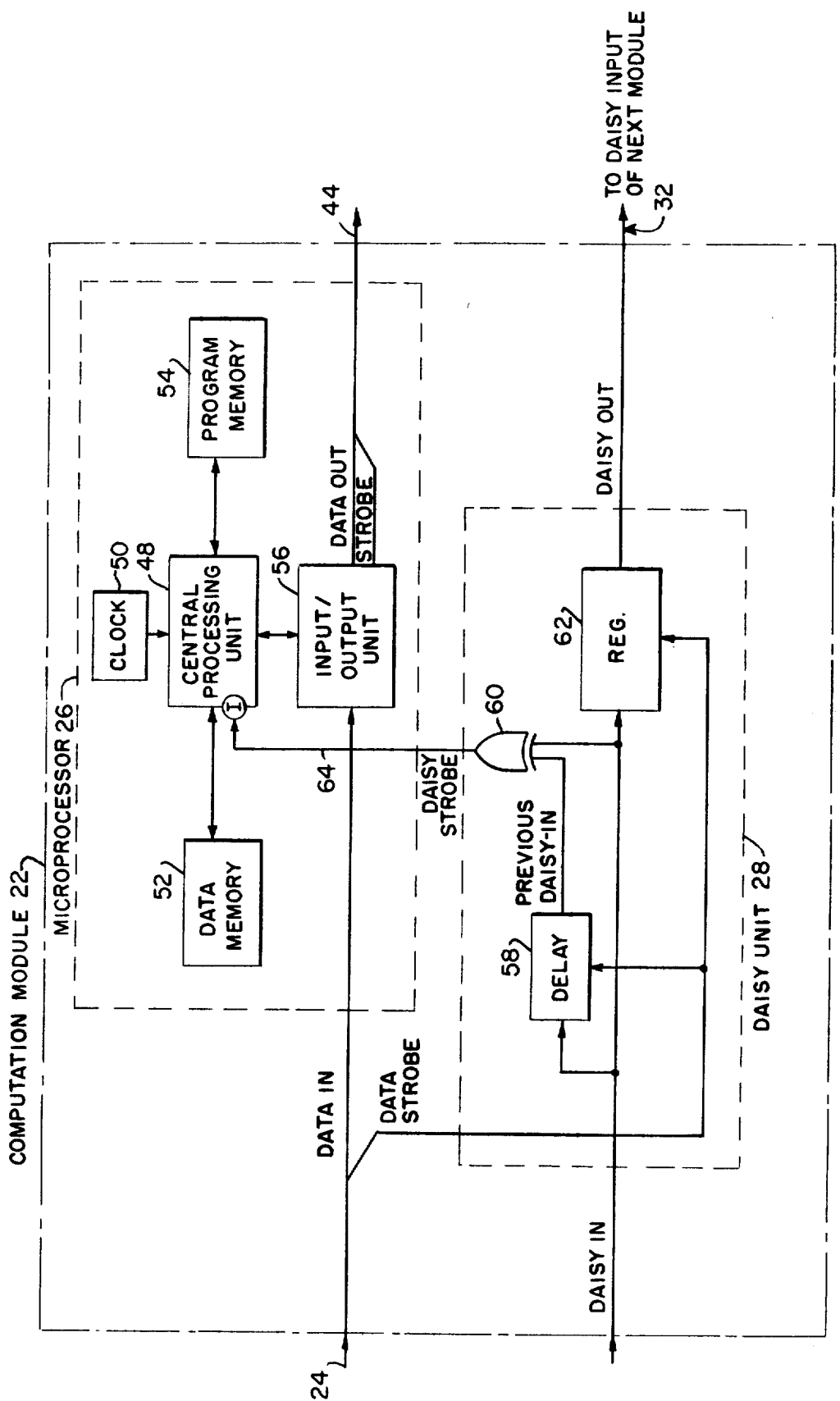
FIG. 2 is a block diagram showing greater detail of the microprocessor and the daisy unit in each of the modules of FIG. 1.

Referring now to FIG. 2, the microprocessor 26 comprises a CPU 48 driven by a clock 50, a data memory 52 and a program memory 54 coupled to the CPU 48, and an input/output unit 56 by which data is coupled from the input bus 24 to the CPU 48 and by which data output from the CPU 48 is coupled to the output bus 44. The daisy unit 28 comprises a delay unit 58, an exclusive-OR circuit 60, and a register 62. The daisy strobe signal is produced at the output terminal of the exclusive-OR circuit 60 and is coupled via line 64 to the interrupt terminal (identified by the legend I) of the CPU 48.

In operation, the microprocessor 26 is of a form readily available from many manufactures. The CPU 48, as is well known, includes an arithmetic unit, buffer storage, and timing and sequencing circuits. The memory 54 stores the program for performing the data processing functions such as, for example, a fast Fourier transform, an averaging function, or the function of finding the complex magnitude. The memory 52 stores mathematical quantities such as intermediate computations to be utilized in performing the computation with the data words on the bus 24. In accordance with well known control circuitry, the CPU 48 activates the unit 56 to input data from the bus 24 to the CPU 48, and to apply the computed quantities as outputs from the CPU via the unit 56 to the output bus 44. A strobe signal for use in strobing the output data on the bus 44 is provided on a dedicated set of parallel line shown fanning into the line 44. The routine of accepting a batch of input data, performing a calculation therewith, and outputing the result of the calculation is initiated by the daisy strobe signal on line 64 applied to the interrupt terminal of the CPU 48.

In the daisy unit 28, the delay unit 58 is inserted between the daisy unit input terminal and one input terminal of the exclusive-OR circuit 60 while the second input terminal of the circuit 60 is coupled directly to the daisy input terminal. The delay unit 58 may be fabricated of a one-bit shift register, by way of example, and is strobed by the data strobe of the input bus 24. The data strobe is provided on a parallel dedicated line of the input bus 24 and is shown fanning out therefrom for connection with the delay unit 58 and the register 62. Upon each strobing by the data strobe, the delay unit 58 presents the previous value of the daisy input signal to the circuit 60. Thereby, the circuit 60 performs the exclusive-OR function, logically equivalent to addition modulo 2, between the present daisy input signal and the previous daisy input signal. The resulting output signal of the circuit 60 is the aforementioned daisy strobe on line 64. The register 62 provides for the advancement of the daisy input signal at the daisy unit 28 to the input terminal of the daisy unit 28 of the succeeding module 22. With reference also to FIG. 1, the action of the register 62 in each daisy unit 28 is seen to provide a sequential advancement of a daisy unit 28 is seen to provide a sequential advancement of a daisy input signal from one daisy unit 28 to the next daisy unit 28 around the ring circuit 32. The inverter 30 changes the output daisy signal from the last (fourth) module 22 from a logic 0 to a logic 1 or vice versa. The output signal of the inverter 30 is coupled to the input terminal of the first daisy unit 28. Accordingly, upon each presentation of the data strobe on the input bus 24, the daisy signal advances one module and, upon successive presentations of the data strobe, the daisy input signal circulates about the ring circuit 32 while being inverted during its passage through the inverter 30.

Figure 3:
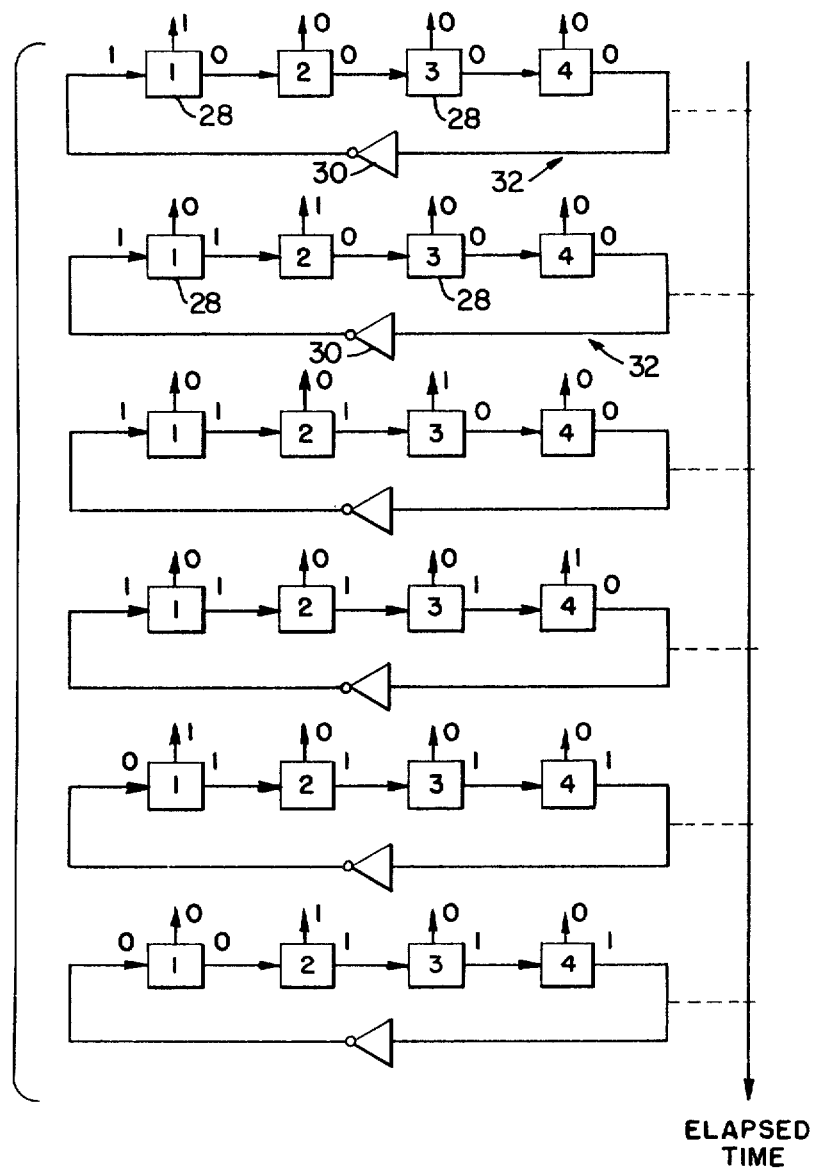
FIG. 3 is a timing diagram showing successive positions of the daisy strobe with reference to the successive daisy units in the ring circuit, the figure showing a succession of the daisy ring circuits with the logic signals superposed thereon.
Figures 4, 5:
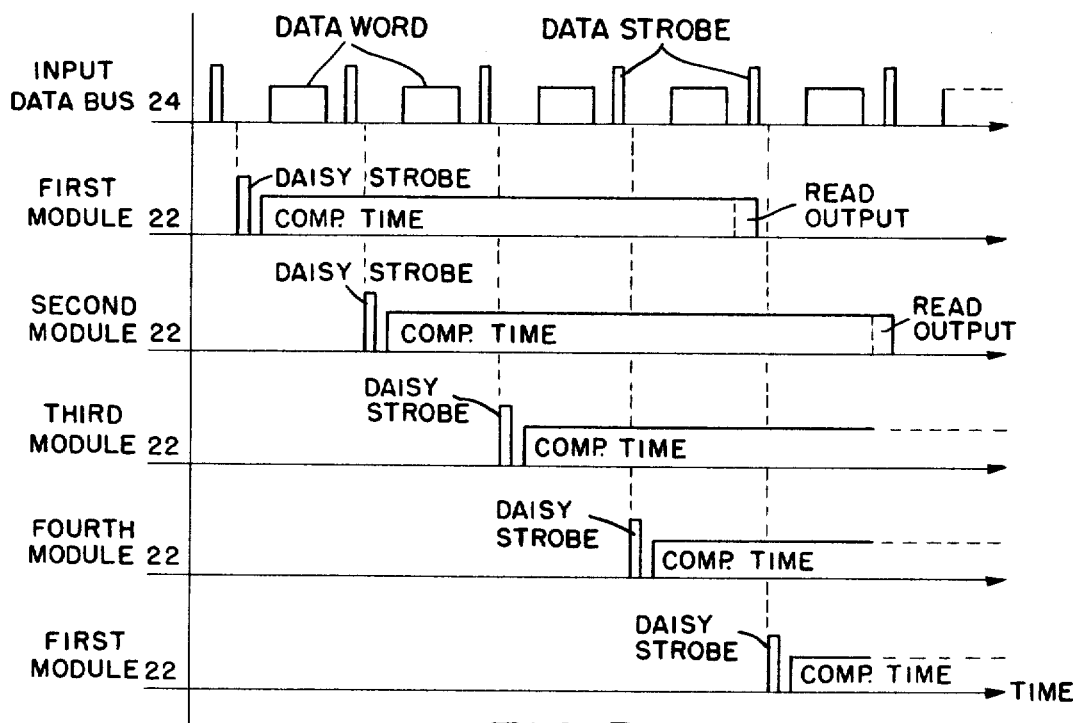
FIG. 4 shows in tabular form the daisy input and daisy strobe signals as a function of the successive occurrences of the data strobe.
FIG. 5 is a timing diagram showing the occurrences of the daisy strobes in reference to the corresponding strobes of the data input signal, the figure also showing the times available for computation by each of the modules, and the times when the computed signal is available at the output terminal of each module for being strobed into the output register of FIG. 1.

Referring also to FIGS. 3, 4 and 5, the sequencing and timing operation of the daisy circuit is further explained. When electric power is first applied to the system 20 of FIG. 1, the output terminals of the register 62 and of the exclusive-OR circuit 60 output a logic zero signal. Accordingly, all of the daisy signals are at a logic zero except for the output terminal of the inverter 30 which is at a logic 1. Upon the occurrence of the first data strobe on the input data bus 24, the exclusive-OR function is performed in each of the daisy units 28. However, only in the first daisy unit is there a difference in logic states between the two input terminals of the exclusive-OR circuit 60 so that, only in the first daisy unit 28, does a logic 1 signal appear for the daisy strobe on line 64. The states of the logic signals at this time for each of the daisy units are shown in the first diagrammatic representation of the daisy circuits 32, portrayed at the top of FIG. 3.

Continuing with the timing sequence as portrayed in FIG. 3, upon the occurrence of the next data strobe on line 24, the circuit 60 in the first of the daisy units 28 has two equal inputs of logic 1 and, accordingly, outputs a logic 0. However, the circuit 60 of the second of the daisy units 28 has unequal inputs, a logic 1 and a logic 0, and, accordingly, outputs a logic 1 on line 64. The corresponding set of logic signals for the daisy ring circuit 32 is seen in the second representation of the ring circuit 32 in FIG. 3. In FIG. 3, the circuit is redrawn six times with the states of logic 0 and logic 1 appended adjacent the corresponding terminals of the daisy units 28. Thereby, it may be seen how the daisy strobe signal on line 64 propagates from one daisy unit 28 to the next daisy unit 28.

The logic states of the daisy signals corresponding to a sequence of nine successive strobings of the data strobe is presented in the tabular format of FIG. 4. The first column of the table of FIG. 4 identifies the data strobes. The second column of FIG. 4 shows the logic states of the input signals of the four daisy units 28 corresponding to the occurrence of each of the data strobes. The corresponding states of the daisy strobe signals on the lines 64 in each of the daisy units 28 are shown in the third column of the table. By viewing both FIGS. 3 and 4, it is seen that, initially, a set of logic zeros circulates through the inverter 30 to become a set of logic one signals. Thereupon, the set of four logic one signals circulates around the ring circuit 32 to be converted by the inverter 30 to logic zero signals. After eight strobings of the data strobe, the original states of the daisy input signals are regained. However, the daisy strobe signal recycles at a period corresponding to four data strobes.

In FIG. 5, the daisy strobe and the intervals of time available for computation by each of the modules 22 are shown in relation to the occurrences of the data strobes and data words on the input data bus 24. The daisy strobe (line 64 in FIG. 2) is seen to occur immediately after a data strobe. Thus, by way of example, the daisy strobe in the first module, seen in the second line of the timing diagram of FIG. 5, occurs immediately after the first data strobe. A space is provided between data strobe and the data word to provide time for the occurrence of the daisy strobe and the beginning of the computation interval prior to the occurrence of the data word. Thereby, the data strobe is able to activate the interrupt circuit of the CPU 48 to initiate its operation prior to the occurrence of the data word on the bus 24. The output data from the microprocessor 26 is made available in the input/output unit 56 prior to the occurrence of a later daisy strobe so that, as shown at the end of the computation interval in the second line of FIG. 5, the data may be read out from the input/output unit 56 and strobed into the output register 46 of FIG. 1.

The third line of the timing diagram of FIG. 5 shows the occurrences of the daisy strobe and the computation time for the second module 22 of FIG. 1. The next two lines of the timing diagram of FIG. 5 show the daisy strobes and the initial portions of the computation intervals for the third and fourth modules 22. In the last line of the timing diagram, timing for the first module 22 is further shown, the line showing the next daisy strobe and the beginning of the next computation interval for the first module 22. By viewing the lines of the timing diagrams, it is readily seen that the operations of the successive modules are staggered in time. Furthermore, the interval of time available for the computation extends over a plurality of data word intervals so that the operational periods of each of the modules overlap. The data throughput rate is four times greater than that which would be obtained for only one module. In the event that more modules were used, for example ten modules in the system 20, then the throughput rate would be increased by a factor of ten over that obtained by the use of only one module 22.

It is noted that a fault tolerance capability may be instituted by operating the modules 22 so as to complete their respective computations prior to the maximum alocated computation time portrayed in FIG. 5. For example, if each module would complete its computation in an interval of time no greater than that occupied by three data words on the bus 24, then an additional time slot would be available for use in the event that a module 22 were to fail. In that case, the three remaining modules would be connected together to form a system of only three modules in which the data handling would be accomplished in the same fashion as that of the four-module system, except that the daisy strobe would cycle through a ring circuit of only three daisy units. The throughput rate would remain unchanged since the modules had not been utilizing the full amount of the available computation time.

It is also noted that the modules need not be identical, it is only required that they perform their requisite data inputting, computation, and data outputting in the time allocated for such operations. Increasing or decreasing the number of modules in the system does not necessitate a programming or software change since the sequencing of the operations is accomplished by the daisy circuit. Accordingly, the foregoing system accomplishes the desired increase in the throughput rate, and can also provide a degree of fault tolerance, while being compatible with the basic system software.

It is to be understood that the above-described embodiment of the invention is illustrative only and that modifications thereof may occur to those skilled in the art. Accordingly, the invention is not to be regarded as limited to the embodiment disclosed herein but is to be limited only as defined by the appended claims.

What is claimed is:

1. A data processing system comprising:
   a plurality of processors connected to a data source, each of said processors performing a predetermined function on data received from said data source independently of the other of said processors;
   a plurality of daisy units interconnected serially in a series arrangement for initiating the operation of said processors on a time-staggered basis by sequentially strobing said processors, each of said daisy units being connected to a mating one of said processors; and
   an inverter connected between the first and last daisy units of said series arrangement for inverting an input signal generated by said last daisy unit and passed to said first daisy unit so as to continuously propagate said strobing;
   each of said daisy units including an exclusive -OR logic circuit having a first input connected to an output terminal of an immediately preceding daisy unit in said series arrangement for receiving a present input signal generated by said immediately preceding daisy unit, and a second input connected to an output of a delay circuit for receiving an immediately previous input signal generated by said immediately preceding daisy unit, said delay circuit having an input connected to said output terminal, said exclusive -OR logic circuit sensing a difference between the logic levels of said present and previous input signals so that said daisy unit subsequently strobes its mating processor so that said processor performs its predetermined function on its received data.

2. A system according to claim 1 comprising a common input data bus connected to said data source and a common output data bus connected to a data output register for receiving results from performances by each of said processors of their predetermined functions, each of said processors being coupled in parallel between said common input data bus and said common output data bus.

3. A system according to claim 2 wherein each of said daisy units are simultaneously strobed by a common strobe signal received over said input data bus from said data source so that each of said daisy units generates an input signal to the next daisy unit in said series arrangement.

4. A system according to claim 2 wherein each of said daisy units includes a reset circuit so that upon the initial energization of said daisy units with electric power the strobe applied by each of said daisy units to its mating processor is initially logic zero.

5. A data processing system comprising:
   a plurality of processing units having an input connected to a common data source through an input bus and an output connected to a common output register through an output bus, each processing unit receiving separate data from said data source over said input bus when strobed by a data strobe signal received over said input bus from said data source, each processing unit performing a predetermined function in connection with said data independently of the operation of the other of said processing units, and outputting a result of said performance of said predetermined function over said output bus to said common output register;
   a plurality of serially interconnected control units for initiating the operation of said processing units in staggered time by sequentially strobing said processing units, each of said control units being connected to a mating one of said processing units and being responsive to said data strobe signal so as to strobe its mating processing unit; and an inverter connected between the first and last control units of said plurality of serially interconnected control units for inverting an input signal generated by said last control unit and passed to said first control unit so as to continuously propagate said sequential strobing.

6. A system according to claim 5 wherein said plurality of control units comprises a plurality of daisy units arranged in a ring circuit for sequentially strobing said processing units to initiate their time-staggered operation.

7. A system according to claim 6 wherein each of said daisy units includes means for storing a previous value of an input signal generated by, and coupled thereto from another of said daisy units located immediately before it in said serial interconnection, and exclusive -OR means for comparing said previous value with a present value of said input signal generated by, and coupled thereto from said other daisy unit so that each of said daisy units strobes its mating processing unit to initiate said unit's operation when the logic levels of said signals are different.

8. A system according to claim 6 and 7 wherein the performance by each of said processing units of its predetermined function overlaps in time the performance by at least a second of said processing units of its predetermined function.

9. A system according to claim 8 further comprising means for receiving the outputs of said time-staggered performances by said processing units via said common output terminal.

10. A data processing system comprising:
a plurality of processing units connected to a common data source and a common output register, each of said processing units independently performing a predetermined function on data received from said data source and passing the results of said performance of said predetermined function to said output register;

a sequencing circuit for sequentially triggering the operation of said processing unit on a time staggered basis;

said sequencing circuit including a plurality of trigger circuits serially interconnected in a ring, each of said trigger circuits being connected to a mating one of said processing units for applying a trigger signal thereto to trigger the operation thereof;

means for strobing said trigger circuits of said sequencing circuit to propagate said application of said trigger signals; and an inverter connected between the first and last trigger circuits of said ring of serially interconnected trigger circuits for inverting a sequencing signal generated by said last control unit and passed to said first control unit to continuously maintain said sequential triggering.

11. A system according to claim 10 wherein said processing units are coupled between a common input terminal connected to said data source and a common output terminal connected to said output register.

12. A system according to claim 11 wherein each of said trigger circuits includes an exclusive -OR logic circuit having a first input connected to an output terminal of an immediately preceding trigger circuit in said ring for receiving a present sequencing signal generated by said immediately preceding trigger circuit in response to the strobing thereof by said strobing means, and a second input connected to an output of a shift register for receiving an immediately previous sequencing signal generated by said immediately preceding trigger circuit in response to the strobing thereof by said strobing means, said shift register having an input connected to said output terminal, said exclusive -OR logic circuit sensing differences in the logic levels of said present and previous sequencing signals so that said trigger circuit subsequently triggers the operation of its mating processor.

* * * * *

UNITED STATES PATENT AND TRADEMARK OFFICE
CERTIFICATE OF CORRECTION

PATENT NO. : 4,428,048
DATED : January 24, 1984
INVENTOR(S) : Edwin P. Berlin, Jr.

It is certified that error appears in the above—identified patent and that said Letters Patent is hereby corrected as shown below:

In column 5, lines 60-61, delete "to provide a sequential advancement of a daisy unit 28 is seen".

In column 9, line 27, Claim 8 should depend from Claim 7.

Signed and Sealed this

Twenty-ninth Day of May 1984

[SEAL]

Attest:

GERALD J. MOSSINGHOFF

*Attesting Officer*  *Commissioner of Patents and Trademarks*